UNITED STATES PATENT OFFICE

JOHN A. RICE, OF BERKELEY, CALIFORNIA, ASSIGNOR TO THE BUBBLESTONE COMPANY, OF PITTSBURGH, PENNSYLVANIA, A CORPORATION OF PENNSYLVANIA

PROCESS OF MAKING POROUS PRODUCTS

No Drawing.    Application filed May 29, 1924. Serial No. 716,825.

The present invention relates to the production of a honey-combed mass of hardened cementitious material, by the employment of small pieces or granules of a jelly-like material, which are mixed with the cement or other mortar or are otherwise incorporated into a plastic mass or motar, either during the preparation of the latter or at a subsequent stage, after which the mortar is allowed to set or dry and harden, and upon drying out the same there will be formed voids to take the place of pieces or particles of jelly or jelly-like material added during the production of the mixture.

The jelly-like material preferably used should be one which contains a large percentage of a readily volatile liquid, for example water, since the operation depends upon the the drying out of the pieces of jelly, to leave voids scattered or disseminated through the body of hardened cement, forming a more or less honey-combed structure, which will be, on account of the large proportion of voids, light in weight, and will be a good insulator for heat and sound, the product being useful either in the form of blocks or bricks, or as a mortar which is hardened upon a surface, such as in the plastering of walls or for the fireproofing of the metal frame work of building structures and the like.

The cement used can be Portland cement, or magnesite cement or water-glass cement, or clay or plaster of Paris or kieselguhr cement or various others, or common lime mortar, or mixtures of several of these. It is not necessary to employ any specific kind of cement, and obviously the cement to be used will depend very largely upon the properties desired in the final product. The usual amount (or any desired amount) of sand can be used in the cement mixture or grout, if desired, or a grout can be made neat, that is, without sand. Also mineral aggregate such as gravel, stone, slag and the like, can be used or omitted, as desired. Stated otherwise, any kind of a mortar or plastic mixture capable of hardening, drying or setting, which is suitable for the purposes to which the final product is to be put, can be employed.

The jelly or jelly-like material can vary through a wide range, depending upon the properties desired in the product, and various other factors.

I give below a number of examples of jellies or gelatinous mixtures which can be used for this purpose, but without in any way restricting myself to the specific examples given.

I. To a 10% solution of glue is added about 0.5% of formalin (an aqueous solution containing about 40% of formaldehyde gas in solution) and the mixture is allowed to stand for a day or longer in order to stiffen into a stiff jelly-like mass. This mass is then comminuted in any suitable manner for instance by being pushed several times through a screen having say 8 or 10 meshes (or any other desired number) per linear inch, to form a large number of small pieces or granules of jelly. The formalin acts to harden this jelly somewhat, and also to waterproof the particles thereof, so that the said jelly will not dissolve to an undue extent in the water with which the cement has been mixed (or is mixed). It is to be understood that the stiffness of the jelly can be modified a good deal, and the amount of formalin added can be varied within wide limits.

The jelly can be mixed, in the form of the granules produced as above described with the dry cement and water, at the time of producing the original cement grout, or the cement and water can be mixed (with or without sand, gravel etc.) to form a mortar or grout, and then mixed with the granulated jelly-like material, the order of mixing being not of very substantial importance. The method which I usually prefer however, is to first mix the cement with the water, (sand or the like also being added if desired), to produce a substantially uniform mixture, and then I throw into the mixture, the granulated jelly, and continue the mixing operation until the same has been thoroughly incorporated into the mortar.

I call attention to the fact that the stiffness of the jelly can vary a good deal, mixtures as low as 1 part of glue to 16 parts of water being found to give satisfactory results in some cases, whereas in other cases mixtures as rich as 1 part of glue to 4 parts of water are preferred. In those mixtures in which a relatively small amount of glue is dissolved in water, it is advisable to use formalin or other hardening agents in larger quantities, because the weak jellies are more readily dissolved by water, from the cement mixture. Thus with a 16.1 glue jelly, I can use 1% of formalin.

The proportion of the cement mixture to jelly can be varied between wide limits, thus for instance, in some cases equal parts by volume gives good results. In other cases I have used considerably less of the jelly, for instance 1 part of jelly to 6 parts of cement mortar (by volume). In other cases I have used proportions as high as 6 parts of the jelly to one part of the cement mortar (by volume). In many cases, I prefer to use ratios between 1 to 2 and 2 to 1, the product in these proportions being generally quite stable.

It is to be understood that glue has above been referred to as a specific example of the material capable of forming a jelly but the invention is by no means restricted thereto. In place of glue, I can use various other jellifying materials, such as gelatin, starch, agar agar, cellulose derivatives, including viscose, silica gel, Irish moss, jellified soap, jellified pectin (with or without suitable hardeners) or mixtures of such materials.

I have above referred to the use of formalin as an agent for hardening and toughening the jelly, and for decreasing the solubility of the jelly in water, such as the water contained in the mortar, but it will be understood that various other substances can be used, such as chromium compounds, aluminum compounds, iron compounds, and the like. These latter compounds also in many cases have some effect upon the setting properties of the cement, particularly when Portland cement is used.

An example of the present application in connection with the production of fire bricks, will now be given, as follows:

A paste or slip was made up, using about 1 part of fire clay and $\frac{1}{10}$th part of water, and the materials were thoroughly mixed. This was then well mixed with a comminuted jelly of agar agar of about 5% strength. About ten parts of the clay paste (containing about 9 parts of dry clay) were used with 25 parts of the comminuted agar agar jelly. The mixture was run into box shaped molds, and allowed to harden, after which the blocks were first dried in the air for several days, afterwards slowly heated up to about 100° C., in order to drive off as much as possible of the water, and were then baked at a temperature of about 100° C., for 12 hours. In this way fire bricks were formed which were extremely porous and had excellent heat insulating properties.

Other examples are as follows:

II. To a hot two percent solution of glue, is added 0.5% of formalin (40% solution of formaldehyde). This mixture is allowed to stand over night, and it will then be found to be in the form of a jelly. This is cut into small pieces and mixed with Portland cement mortar, or with a clay mortar. The mass is then molded and allowed to set and harden. The blocks or slabs formed are useful for building purposes, having good heat insulating powers.

III. A jelly of Irish moss (2%) is chopped up and used with plaster of Paris, in slabs for heat-insulation.

IV. A silica gel, about 2 to 5%, in comminuted form is used as a filler in lime hydrate or clay. The molded slabs are useful for building purposes.

V. An iron, aluminum or chromium salt such as sulfate or chlorid, is added to a 5% hot solution of cheap gelatin. After hardening as above, the comminuted jelly is used with Portland cement in making blocks, or is applied with a trowel, as in plastering. Only a small amount of the salt is necessary, say 0.1 to 0.6% (based on the weight of the gelatin). This salt acts to improve the ultimate hardness of the cement.

In other modes of operation it might be possible to add to the jelly, the dry cement (and sand) and the water, and then chop up the jelly while mixing the mortar.

Of the various jellies thus far tested, the most satisfactory results have been produced when using glue as the base of the jelly.

My invention is applicable to the preparation of any material which hardens or sets on drying; that is to say, particles of desired size of material which shrinks considerably on drying may be added to any wet or dry mortar, no matter what the binder material therein may be and no matter what filler materials may be present in the mortar. In other words, I may use a mixture of any material which sets or hardens on drying, and then add particles of any material which may shrink on drying, and thereby produce a more or less hard finished product containing voids of the number and size desired. I may even replace filler materials with voids in the finished product.

As a general rule, the shrinkable materials best suited for incorporation in the mortar for the production of the voids are of colloid nature, the most available being hydrogels which contain a comparatively small amount of the colloid itself and a large amount of water, although it is to be distinctly understood that my invention is not limited to hydrogels.

A very convenient way of sub-dividing a mass of shrinkable material is to force the same the requisite number of times, generally twice, through a wire sieve, although other methods may be used.

I claim:

1. A process which comprises the step of mixing a stiff jelly in a comminuted state, into a mortar.

2. A process which comprises comminuting a jelly containing water as its largest constituent, mixing the same into a mortar, throughout the mass of the latter, and allowing the mortar to set, the said jelly being in sufficient amount to form a porous mass on hardening of the mortar.

3. The process of making a porous article which comprises the steps of forcing a stiff jelly through a sieve, mixing said granular jelly into a mortar, and causing the latter to harden.

4. The process of making a porous article which comprises the steps of forming a jelly having a high percentage of volatile matter, granulating said jelly, mixing said granulated jelly into a mortar, and causing the latter to harden.

In witness whereof, I have hereunto set my hand at Washington, D. C., this third day of May, A. D. nineteen hundred and twenty-four.

JOHN A. RICE.